(12) United States Patent
Mahaffey

(10) Patent No.: US 8,212,386 B2
(45) Date of Patent: Jul. 3, 2012

(54) POWER SUPPLY SYSTEM

(75) Inventor: Robert Mahaffey, Vancouver (CA)

(73) Assignee: ACCO Brands Corporation, Lincolnshire, IL (US)

( * ) Notice: Subject to any disclaimer, the term of this patent is extended or adjusted under 35 U.S.C. 154(b) by 29 days.

(21) Appl. No.: 12/620,342

(22) Filed: Nov. 17, 2009

(65) Prior Publication Data

US 2010/0090531 A1    Apr. 15, 2010

Related U.S. Application Data

(62) Division of application No. 11/690,068, filed on Mar. 22, 2007, now Pat. No. 7,642,671.

(60) Provisional application No. 60/796,117, filed on Apr. 28, 2006.

(51) Int. Cl.
    *H01R 29/00*    (2006.01)

(52) U.S. Cl. ............ 307/12; 439/43; 439/166; 439/174; 439/175

(58) Field of Classification Search .................... 307/12; 439/43, 166, 174, 175
    See application file for complete search history.

(56) References Cited

U.S. PATENT DOCUMENTS

| | | |
|---|---|---|
| 3,714,452 A | 1/1973 | Williamson |
| 3,967,133 A | 6/1976 | Bokern |
| 4,232,260 A | 11/1980 | Lambkin |
| 4,543,624 A | 9/1985 | Rumble |
| 4,593,346 A | 6/1986 | Nooijen et al. |
| 4,784,614 A | 11/1988 | Sadigh-Behzadi |
| 4,804,916 A | 2/1989 | Frank |
| 4,879,624 A | 11/1989 | Jones et al. |
| 4,990,099 A | 2/1991 | Marin et al. |
| 5,007,863 A | 4/1991 | Xuan |
| 5,027,255 A | 6/1991 | Zeitlin et al. |
| 5,079,410 A | 1/1992 | Payne et al. |
| 5,150,032 A * | 9/1992 | Ho .............................. 320/130 |
| 5,159,545 A | 10/1992 | Lee |
| 5,164,652 A | 11/1992 | Johnson et al. |
| 5,245,220 A | 9/1993 | Lee |

(Continued)

FOREIGN PATENT DOCUMENTS

DE    202004012487 U1    12/2004

(Continued)

OTHER PUBLICATIONS

Search/Examination Report dated Mar. 1, 2011 from European Patent Application No. 07811849.4, 3 pages.

(Continued)

*Primary Examiner* — Adi Amrany
(74) *Attorney, Agent, or Firm* — Kilpatrick, Townsend & Stockton LLP

(57) ABSTRACT

A power supply system. The power supply system may have a power circuit having a switch and adapted to generate a first output voltage and a second output voltage, depending on the state of the switch. It also includes an output connector coupled to the power circuit, where the output connector includes a plurality of electrical contacts including a first electrical contact and a second electrical contact. A voltage output indicator device is coupled to the first and second electrical contacts. The voltage output indicator device indicates that the power circuit is producing the first output voltage or the second output voltage, so that the user is aware of the voltage being output by the power supply system.

14 Claims, 11 Drawing Sheets

U.S. PATENT DOCUMENTS

| | | |
|---|---|---|
| 5,254,931 A | 10/1993 | Martensson |
| 5,295,058 A | 3/1994 | McGreevy |
| 5,297,015 A | 3/1994 | Miyazaki et al. |
| 5,302,857 A | 4/1994 | Charles et al. |
| 5,321,349 A | 6/1994 | Chang |
| 5,332,993 A | 7/1994 | Ninomiya |
| 5,333,177 A | 7/1994 | Braitberg et al. |
| 5,334,044 A | 8/1994 | Falossi et al. |
| 5,341,503 A | 8/1994 | Gladstein et al. |
| 5,342,356 A | 8/1994 | Ellman et al. |
| 5,347,211 A | 9/1994 | Jakubowski |
| 5,369,352 A | 11/1994 | Toepfer et al. |
| 5,391,976 A | 2/1995 | Farrington et al. |
| 5,400,239 A | 3/1995 | Caine |
| 5,400,267 A | 3/1995 | Denen et al. |
| 5,420,496 A | 5/1995 | Ishikawa |
| 5,475,271 A | 12/1995 | Shibasaki et al. |
| 5,479,331 A | 12/1995 | Lenni |
| 5,493,683 A | 2/1996 | Cloud et al. |
| 5,506,490 A | 4/1996 | DeMuro |
| 5,532,524 A | 7/1996 | Townsley et al. |
| 5,547,399 A | 8/1996 | Naghi et al. |
| 5,557,738 A | 9/1996 | Townsley et al. |
| 5,563,782 A * | 10/1996 | Chen et al. ............... 363/146 |
| 5,568,370 A | 10/1996 | Goldstein et al. |
| 5,570,002 A | 10/1996 | Castlemas |
| 5,581,692 A | 12/1996 | Nevitt et al. |
| 5,613,863 A | 3/1997 | Klaus et al. |
| 5,619,404 A * | 4/1997 | Zak ............... 363/21.09 |
| 5,636,110 A | 6/1997 | Lanni |
| 5,648,712 A | 7/1997 | Hahn |
| 5,684,712 A | 11/1997 | Goffe et al. |
| 5,739,667 A | 4/1998 | Matsuda et al. |
| 5,745,670 A | 4/1998 | Linde |
| 5,771,160 A * | 6/1998 | Seong ............... 363/20 |
| 5,783,927 A | 7/1998 | Chen |
| 5,790,896 A | 8/1998 | Nguyen |
| 5,811,895 A | 9/1998 | Suzuki et al. |
| 5,838,554 A | 11/1998 | Lanni |
| 5,844,472 A | 12/1998 | Lee |
| 5,861,729 A | 1/1999 | Maeda et al. |
| 5,899,960 A | 5/1999 | Moore et al. |
| 5,903,764 A | 5/1999 | Shyr et al. |
| 5,906,509 A | 5/1999 | Wu |
| 5,916,313 A | 6/1999 | Brown |
| 5,949,213 A | 9/1999 | Lanni |
| 5,963,015 A | 10/1999 | Lee |
| 5,967,807 A | 10/1999 | Wu |
| 5,973,948 A | 10/1999 | Hahn et al. |
| 5,986,437 A | 11/1999 | Lee |
| 5,998,964 A | 12/1999 | Martensson |
| 6,035,261 A | 3/2000 | Carpenter et al. |
| 6,061,261 A | 5/2000 | Chen et al. |
| 6,064,177 A | 5/2000 | Dixon |
| 6,080,022 A * | 6/2000 | Shaberman et al. .......... 439/680 |
| 6,091,611 A | 7/2000 | Lanni |
| 6,111,772 A | 8/2000 | Lee et al. |
| 6,140,926 A | 10/2000 | Hayden et al. |
| 6,172,884 B1 | 1/2001 | Lanni |
| 6,184,653 B1 | 2/2001 | Wu |
| 6,191,552 B1 | 2/2001 | Kates et al. |
| 6,202,171 B1 | 3/2001 | Townsley et al. |
| 6,212,088 B1 | 4/2001 | Yoo |
| 6,227,888 B1 | 5/2001 | Hahn |
| 6,250,939 B1 | 6/2001 | Chou |
| 6,266,261 B1 | 7/2001 | Lanni |
| 6,330,144 B1 | 12/2001 | Lee et al. |
| 6,337,557 B1 | 1/2002 | Kates et al. |
| 6,358,096 B1 | 3/2002 | Beckman |
| 6,360,177 B1 | 3/2002 | Curt et al. |
| 6,361,355 B1 | 3/2002 | Matsuoka et al. |
| 6,362,610 B1 | 3/2002 | Yang |
| 6,396,726 B1 | 5/2002 | Austin et al. |
| 6,402,546 B1 | 6/2002 | Groves et al. |
| 6,406,313 B1 | 6/2002 | Victor |
| 6,459,175 B1 | 10/2002 | Potega |
| 6,459,604 B1 | 10/2002 | Youn et al. |
| 6,483,204 B2 | 11/2002 | Hanaki |
| 6,509,659 B1 | 1/2003 | Carroll et al. |
| 6,528,970 B1 | 3/2003 | Liu et al. |
| 6,538,341 B1 | 3/2003 | Lang |
| 6,544,058 B1 | 4/2003 | Chang |
| 6,563,713 B2 | 5/2003 | Yang |
| 6,597,565 B1 | 7/2003 | Kluth et al. |
| 6,621,248 B1 | 9/2003 | Li |
| 6,623,294 B2 | 9/2003 | Tse et al. |
| 6,628,535 B1 * | 9/2003 | Wu ............... 363/146 |
| 6,634,896 B1 | 10/2003 | Potega |
| 6,638,113 B2 | 10/2003 | Kajiwara et al. |
| 6,643,158 B2 | 11/2003 | McDonald et al. |
| 6,650,560 B2 | 11/2003 | MacDonald et al. |
| 6,664,758 B2 * | 12/2003 | Yang ............... 320/107 |
| 6,669,495 B2 | 12/2003 | Philips et al. |
| 6,669,513 B2 | 12/2003 | Huang |
| 6,693,413 B1 | 2/2004 | Lanni |
| 6,700,808 B2 | 3/2004 | MacDonald et al. |
| 6,707,284 B2 | 3/2004 | Lanni |
| 6,741,064 B2 | 5/2004 | Liu et al. |
| 6,744,150 B2 | 6/2004 | Rendic |
| 6,751,109 B2 | 6/2004 | Doss et al. |
| 6,758,697 B1 | 7/2004 | Wu |
| 6,761,592 B2 | 7/2004 | Wu |
| 6,774,603 B2 | 8/2004 | Liao |
| 6,775,163 B2 | 8/2004 | McDonald et al. |
| 6,780,033 B2 | 8/2004 | Liu |
| 6,780,048 B2 | 8/2004 | Chen et al. |
| 6,791,853 B2 | 9/2004 | Afzal et al. |
| 6,795,302 B2 | 9/2004 | Kluth et al. |
| 6,809,943 B2 | 10/2004 | Lanni |
| 6,831,848 B2 | 12/2004 | Lanni |
| 6,836,101 B2 | 12/2004 | Lanni |
| 6,879,497 B2 * | 4/2005 | Hua et al. ............... 363/16 |
| 6,922,347 B2 | 7/2005 | Lanni |
| 6,929,516 B2 * | 8/2005 | Brochu et al. ............... 439/677 |
| 6,986,067 B2 | 1/2006 | Ocaohhara et al. |
| 7,028,202 B2 | 4/2006 | Long et al. |
| 7,035,126 B1 | 4/2006 | Lanni |
| 7,056,149 B1 * | 6/2006 | Lanni ............... 439/488 |
| 7,081,008 B2 * | 7/2006 | Tan ............... 439/502 |
| 7,140,922 B2 * | 11/2006 | Luu et al. ............... 439/651 |
| 7,212,420 B2 * | 5/2007 | Liao ............... 363/146 |
| 7,224,086 B2 * | 5/2007 | Germagian et al. .......... 307/128 |
| 7,245,515 B2 * | 7/2007 | Chiang ............... 363/146 |
| 7,273,384 B1 * | 9/2007 | So ............... 439/172 |
| 7,345,381 B2 * | 3/2008 | Harris et al. ............... 307/81 |
| 7,422,473 B2 * | 9/2008 | Portwood ............... 439/501 |
| 7,442,077 B2 | 10/2008 | Peress et al. |
| 7,495,491 B2 | 2/2009 | Wu |
| 7,613,021 B2 | 11/2009 | Lanni |
| 7,863,770 B2 | 1/2011 | Lanni |
| 7,999,412 B2 | 8/2011 | Lanni |
| 8,009,451 B2 * | 8/2011 | So ............... 363/142 |
| 2002/0055288 A1 | 5/2002 | Philips et al. |
| 2002/0115480 A1 | 8/2002 | Huang |
| 2003/0008550 A1 | 1/2003 | Tse et al. |
| 2003/0015991 A1 | 1/2003 | Tung et al. |
| 2003/0042881 A1 | 3/2003 | Lanni |
| 2003/0048096 A1 | 3/2003 | Liu et al. |
| 2003/0060243 A1 | 3/2003 | Burrus |
| 2003/0080630 A1 | 5/2003 | Liu |
| 2003/0085621 A1 | 5/2003 | Potega |
| 2003/0117104 A1 | 6/2003 | Liao |
| 2003/0128020 A1 | 7/2003 | Lanni |
| 2003/0128507 A1 | 7/2003 | Metcalf |
| 2003/0132668 A1 | 7/2003 | Lanni |
| 2003/0141840 A1 | 7/2003 | Sanders |
| 2003/0151392 A1 | 8/2003 | Stone et al. |
| 2003/0151936 A1 | 8/2003 | MacDonald et al. |
| 2003/0184259 A1 | 10/2003 | Yang |
| 2003/0201676 A1 | 10/2003 | Su |
| 2003/0211767 A1 | 11/2003 | Philips et al. |
| 2003/0216069 A1 | 11/2003 | Huang |
| 2003/0218550 A1 | 11/2003 | Herrmann |
| 2003/0222503 A1 | 12/2003 | Lam et al. |
| 2003/0228792 A1 | 12/2003 | Lanni |
| 2003/0230934 A1 | 12/2003 | Cordelli et al. |
| 2003/0232530 A1 | 12/2003 | Vista et al. |

| | | |
|---|---|---|
| 2004/0008462 A1 | 1/2004 | Kluth et al. |
| 2004/0037102 A1 | 2/2004 | McDonald et al. |
| 2004/0073820 A1 | 4/2004 | Hsu |
| 2004/0085043 A1 | 5/2004 | Germagian et al. |
| 2004/0085694 A1 | 5/2004 | Germagian et al. |
| 2004/0100807 A1 | 5/2004 | MacDonald et al. |
| 2004/0108833 A1 | 6/2004 | Lanni |
| 2004/0108839 A1 | 6/2004 | Stone et al. |
| 2004/0108843 A1 | 6/2004 | Lanni |
| 2004/0130304 A1 | 7/2004 | Lanni |
| 2004/0170039 A1 | 9/2004 | MacDonald et al. |
| 2004/0189253 A1 | 9/2004 | Tanabe et al. |
| 2004/0218411 A1 | 11/2004 | Luu et al. |
| 2005/0151506 A1* | 7/2005 | Kennedy et al. ............. 320/111 |
| 2005/0173989 A1* | 8/2005 | Wu ............................... 307/82 |
| 2005/0201124 A1 | 9/2005 | Lanni |
| 2005/0219882 A1 | 10/2005 | Wu |
| 2005/0259456 A1 | 11/2005 | Chiang |
| 2005/0285547 A1 | 12/2005 | Piepgras |
| 2006/0163948 A1* | 7/2006 | Kim et al. ....................... 307/18 |
| 2007/0136497 A1* | 6/2007 | Trivedi ............................. 710/62 |
| 2007/0279952 A1 | 12/2007 | Lanni |
| 2007/0296380 A1 | 12/2007 | Lanni |
| 2008/0012425 A1 | 1/2008 | Lanni |
| 2008/0019154 A1 | 1/2008 | Lanni |
| 2008/0019156 A1 | 1/2008 | Lanni |
| 2008/0164764 A1* | 7/2008 | So .................................. 307/75 |

FOREIGN PATENT DOCUMENTS

| | | |
|---|---|---|
| EP | 1372254 A2 | 12/2003 |
| GB | 2388971 A | 11/2003 |
| GB | 2411780 A | 9/2005 |
| JP | 1081113 A | 3/1989 |
| JP | 2005328635 A | 11/2005 |
| WO | WO 03/038978 A1 | 5/2003 |
| WO | WO 03/038979 A1 | 5/2003 |
| WO | WO 03/038980 A1 | 5/2003 |
| WO | WO 2004/068324 A1 | 8/2004 |

OTHER PUBLICATIONS

Powerstream Technology (author unknown) High Quality Automobile to Laptop DC/DC Converter. Feb. 6, 2006. Copyright 2004. [retrieved on Oct. 11, 2007], [retrieved from the internet]<http://web.archive.org/web/20060206080604/http://www.powerstream.com/Produz10htm>pp. 1-4.

Radio Shack 1990 Catalog, No. 446, pp. 151.

Radio Shack 1994 Catalog, pp. 142.

Radio Shack 1995 Catalog, pp. 150-151.

Minwa Products-MW182, Mar. 10, 1993. Super Selection of Power Adapters-Radio Shack Catalog, (Dec. 1992; Catalog p. 128 #472.

* cited by examiner

POWER SUPPLY SYSTEM

CROSS-REFERENCES TO RELATED APPLICATIONS

This application is a divisional of U.S. patent application Ser. No. 11/690,068, filed Mar. 22, 2007, which is a non-provisional of and claims the benefit of the filing date of U.S. Provisional Patent Application No. 60/796,117, filed on Apr. 28, 2006, which are herein incorporated by reference in their entirety for all purposes.

BACKGROUND OF THE INVENTION

Today, various electronic devices exist. Such electronic devices include cellular phones, portable computers, MP3 players, personal digital assistants (PDAs), etc. A person may own one or all of such portable electronic devices and each portable electronic device may have a separate power supply system associated with it. The use of many different power supplies is not desirable, since power supplies (sometimes called "power bricks") are often very bulky and cumbersome. For example, if a person owns a portable computer, a cellular phone, and an MP3 player, that person would also own three portable power supplies for those three portable electronic devices. If that person is traveling, it is quite cumbersome for that person to carry all of those portable power supplies with him.

In response to this need, some have developed "universal" power supplies. One such power supply is described in U.S. Pat. No. 5,838,554. This patent describes the use of a single power adapter for use with a plurality of different tips which can connect to different types of portable electronic devices. Each tip includes a different electrical component in it. In use, a tip is connected to the power adapter. The circuitry in the power adapter senses the electrical component in the tip and a feedback signal is provided to power circuitry containing a programmed IC chip. The power circuitry, in turn, provides a first output voltage. If a second tip with a different electrical component is selected, a different feedback signal is sent to the power circuitry and the power circuitry then produces a second output voltage associated with the second tip.

Although systems like the one described in U.S. Pat. No. 5,838,554 are effective in some instances, they could be improved. For example, the feedback circuitry that is used in such systems is complex and is relatively expensive to produce. The use of the above-described IC chip increases the cost of such power supplies.

What is desired is a simpler, more cost effective universal power supply solution. Embodiments of the invention address these and other problems, collectively and individually.

SUMMARY OF THE INVENTION

Embodiments of the invention are directed to power supply systems and methods for using power supply systems.

One embodiment of the invention is directed to a power supply system comprising a power circuit comprising a switch and adapted to generate a first output voltage or a second output voltage, depending on the state of the switch (e.g., a slide switch, a push button, etc.). It also includes an output connector coupled to the power circuit, where the output connector includes a plurality of electrical contacts comprising a first electrical contact and a second electrical contact. A voltage output indicator device is coupled to the first and second electrical contacts. The voltage output indicator device indicates that the power circuit is producing the first output voltage or the second output voltage, so that the user is aware of the voltage being output by the power supply system.

Another embodiment of the invention is directed to a power supply system comprising a power circuit comprising a switch (e.g., a slide switch, a push button, etc.). The power supply is adapted to generate a first output voltage and a second output voltage depending on a state of the switch. An output connector is coupled to the power circuit. The output connector includes a plurality of electrical contacts including a first set of contacts adapted to provide the first output voltage and a second set of electrical contacts adapted to provide the second output voltage. The first and second sets of contacts are different.

Another embodiment of the invention is directed to a power supply system comprising a power circuit adapted to generate a first output voltage and a second output voltage at the same time. An output connector is coupled to the power circuit. The output connector includes a plurality of electrical contacts including a first set of contacts adapted to provide the first output voltage and a second set of electrical contacts adapted to provide the second output voltage at the same time as the first output voltage. The first and second sets of contacts are different. The first connector can be configured to connect to the output connector and can electrically couple to the first set of contacts to provide the first output voltage to a first electronic device. Alternatively, a second connector can be configured to connect to the output connector and electrically couple to the second set of contacts to provide the second output voltage to a second electronic device.

Other embodiments of the invention are directed to methods such as methods for using such power supply systems.

These and other embodiments of the invention are described in further detail below.

BRIEF DESCRIPTION OF THE DRAWINGS

FIGS. 2(b) and 2(c) show invisible lines showing electrical contacts that are capable of coupling to electrical contacts in a common output connector.

DETAILED DESCRIPTION

Figure 1A:
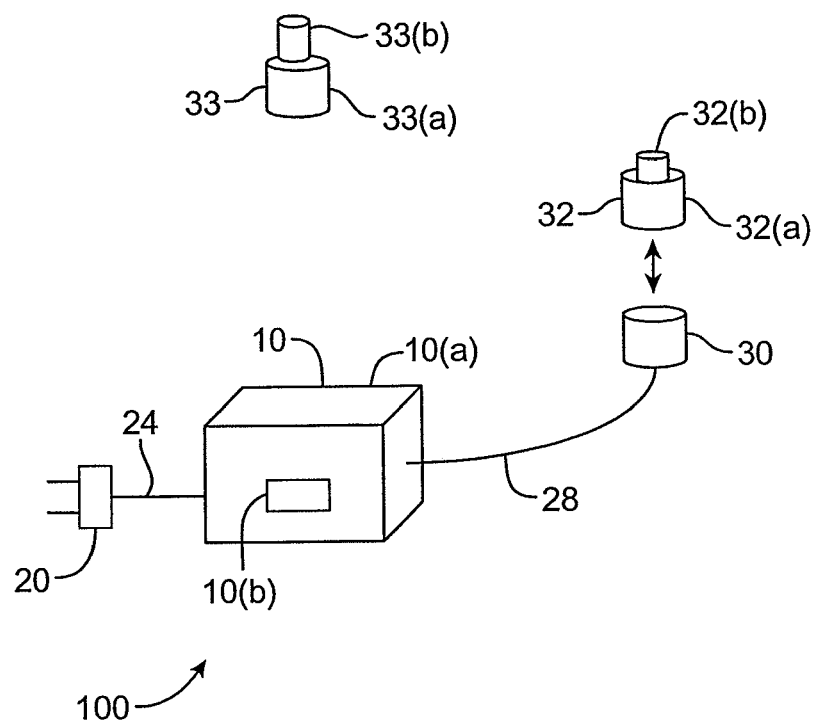
FIG. 1(a) shows a perspective view of a power supply system according to an embodiment of the invention.

Embodiments of the invention are directed to power supply systems. An exemplary power supply system comprises a power adapter which may house a power circuit. The power circuit may output a plurality of voltages (e.g., 16 VDC or 19.5 VDC). The voltages may be output simultaneously from the power circuit or may be output independently from the power circuit depending on the state of an external switch. Various connectable connectors such as connector tips can be mechanically and electrically coupled to an output connector in the power adapter. The various connectable connectors may be used with different electronic devices.

Any suitable type of electronic device can be powered by the power supply systems according to embodiments of the invention. Examples of electronic devices comprise notebook computers, cell phones, MP3 players, televisions, etc.

The output connector coupled to the power circuit, and the connectable connectors that are connectable to the output connector may have any suitable shape and/or configuration. Each connectable connector may be cooperatively structured with the output connector so that it can be easily connected to and separated from the output connector. For example, the output connector may be a female type connector, and may mechanically mate with male-type first and second connectable connectors (or vice versa). Each connectable connector and each output connector can also have a plurality of electrical conductors with corresponding electrical contacts.

The connectable connectors may be in any suitable form. For example, connectable connectors may be in the form of connector tips, connector wires, connection apparatuses, etc. A preferred connectable connector may be in the form of a connector tip, which would be in between the power adapter and the electronic device being powered.

As noted above, conventional power adapters require some method of feedback from the tip to the power circuit to cause it to output a particular voltage. Embodiments of the invention do not require this. In embodiments of the invention, a power circuit in a power supply system outputs a plurality of voltages (e.g., two voltages −16V and 19V), and the selection of a connector tip or the like can determine which voltage will be ultimately output. The power circuit in the power supply system may also output different voltages depending on the state of a power switch. The connector tips can be used to charge electronic devices such as notebook computers.

It has been determined that a universal power supply can output at least two discrete voltages of about +16 VDC (+/−1 or 2 Volts) and about +19.5 VDC (+/−1 or 2 Volts) and can be used to provide power to most notebook computers on the market today. In preferred embodiments, the power circuit in the power supply is adapted to provide only two discrete voltages to simplify the design of the power supply and power circuit. Although a notebook computer may be designed to work with a specific input voltage such as 20 V, it has been determined that the notebook computer may tolerate a slight deviation from 20V. The typical deviation could be +/−1 or 2 Volts. Therefore, if a universal power supply could use a connector tip to output 19.5 VDC, it would be able to supply power to notebook computers that are designed to accept 19 V, 19.5 V, and 20V. Thus, one connector tip type may be provided to provide power to a number of brands of notebook computers, instead of one brand of notebook computers as long as the mechanical tip type can fit into the power ports of such notebook computers. Current universal power supplies may have as many as 37 connector tips that work with a single power brick. Having too many connector tips can be cumbersome as well as confusing. Having too many connector tips with too may different voltage ratings can also increase the chances that the consumer may use the incorrect one and damage his notebook computer. Too many connector tips with too many different voltages may also increase the overall cost of the universal power supply system.

In preferred embodiments, there can be two (or more) connector tip types that can connect to the output connector coupled to a power circuit configured to generate at least two discrete voltages. The connector tip types would respectively output about +16 VDC and about +19.5 VDC when connected to the output connector. The connector tip types would be compatible with most commercially available notebook computers. For example, a first connector tip type may provide an output voltage at about 19.5 V when connected to the output connector and may have relative dimensions (OD/ID) of 4.75/1.7, 5.5/1.7, 5.5/2.1, 5.5/2.5, 6/1.4, 7.4/0.6 corresponding to 6 connector tips. A second connector tip type may output a voltage of 16V when connected to the output connector and may have relative dimensions (OD/ID) of 5.5/2.5, 6/1.4, 6.3/3 corresponding to 3 connector tips. Thus, in an exemplary power supply system according to an embodiment of the invention, there can be (i) a power adapter comprising a power circuit and an output connector, (ii) a first type of connector tip and multiple physical configurations of that first type of connector tip, and (ii) a second type of connector tip and multiple physical configurations of that second type of connector tip.

To enable the power supply system to charge multiple devices and/or low powered devices, the power adapter can include a low powered female USB port (at least one) on the body of the adapter or a combination of ports (e.g., a female USB port and a female FireWire port). The ports can be selected based on available/common charging cables for devices.

In one embodiment of the invention, the power supply system comprises a power circuit adapted to generate a first output voltage and a second output voltage at the same time, and an output connector coupled to the power circuit. The output connector includes a plurality of electrical contacts including a first set of contacts adapted to provide the first output voltage and a second set of electrical contacts adapted to provide the second output voltage at the same time as the first output voltage. The first and second sets of contacts are different. A first connector (e.g., a first connector tip) can be configured to connect to the output connector and electrically couple to the first set of contacts to provide the first output voltage to a first electronic device (e.g., a portable computer made by manufacturer A). Alternatively, a second connector (e.g., a second connector tip) can be configured to connect to the output connector and electrically couple to the second set of contacts to provide the second output voltage to a second electronic device (e.g., a portable computer made by manufacture B).

In a specific example, there can be three conductive contacts in an output connector that is coupled to the power circuit. The three conductive contacts could have the values: GND, +16 VDC, and +19 VDC. In preferred embodiments, the different output voltages that can be provided by the contacts in the output connector can range from about 15-17

VDC (or 14-17 VDC) for a first connector, and about 18-20 VDC (or 17-21 VDC) for a second connector.

Unlike conventional universal power supplies, in this embodiment of the invention, the connectable connector does not have an electrical component that provides feedback to a power circuit to cause the power circuit to generate a specific voltage. Rather, in this embodiment of the invention, the voltages are always available and the voltage output that is ultimately provided by the power supply system depends on the connectable connector that is connected to the output connector that is coupled to the power circuit.

If the connectable connectors in the power supply system are connector tips, each connector tip can act as a jumper to different sets of contacts in the output connector to output the correct voltage. For example, the output connector can have a plurality of electrical contacts including contacts A, B, and C. The first connector tip may have contacts that connect to a first set of contacts A and B in the output connector to produce a first output voltage associated with a first electronic device. A second connector tip may have contacts that connect to a second set of contacts A and C in the output connector to produce a second output voltage associated with a second electronic device. Although two connector tips and three electrical contacts in an output connector are described in detail, more than two connector tips and more than three electrical contacts in an output connector can be used in other embodiments of the invention.

FIG. 1(a) shows a power supply system 100 according to an embodiment of the invention. The power supply system 100 includes a power adapter 10 including a casing (e.g., a plastic casing) 10(a) and an optional auxiliary connector port 10(b) in the casing. A wire 28 (or cable) couples an output connector 30 to the power adapter 10. The power adapter 10 may include power supply components and/or power circuit components including transformers, rectifiers, inverters, etc. Another wire 24 couples an input connector 20 to the power adapter 10. The input connector 20 may be a household plug that plugs into an AC power source. Alternatively, the input connector 20 may be a plug (e.g., a cigarette lighter plug) that plugs into a DC power source.

The power supply system 100 may also include a first connector 32, which may be in the form of connector tip. The connector 32 may include a body portion 32(a) that is configured to mate with the output connector 30, and a mating portion 32(b) which mates with a port of a first electronic device (not shown). The first connector 32 may also have electrical contacts that electrically couple to only a certain set of electrical contacts (e.g., contacts A and B) in a plurality of contacts (e.g., contacts A, B, and C) in the output connector 30.

The power supply system 100 may also include a second connector 33, which may be in the form of connector tip. The second connector 33 may include a body portion 33(a) that is configured to mate with the output connector 30 when the first connector 32 is not used. The second connector 33 may also include a mating portion 33(b) which mates with a port of a second electronic device (not shown). The second connector 33 may also have electrical contacts that electrically couple to only a certain set of electrical contacts (e.g., contacts A and C) in a plurality of contacts (e.g., contacts A, B, and C) in the output connector 30.

In FIG. 1(a), the mating portions 32(b), 33(b) of the respective connectors 32, 33 may have different form factors as they are used with different port configurations on different electronic devices. However, the body portions 32(a), 33(a) of the respective connectors 32, 33 may have the same form factors as they are capable of connecting to the same output connector 30 (this is also applicable to later described embodiments). The body portions 32(a), 33(a) including different sets of contacts which will electrically couple to corresponding sets of contacts in the output connector 30. In embodiments of the invention, some members of the sets may be the same in some cases, but the sets are different. For example, if the output connector 30 has contacts A, B, and C, then a first connector may have corresponding connectors A and B, while a second connector may have corresponding contacts A and C. In this example, the sets of contacts (i.e., A-B, and A-C) are different, yet they have one common member A. In other embodiments, it is not necessary for the sets to have at least one common member.

Figure 1B:
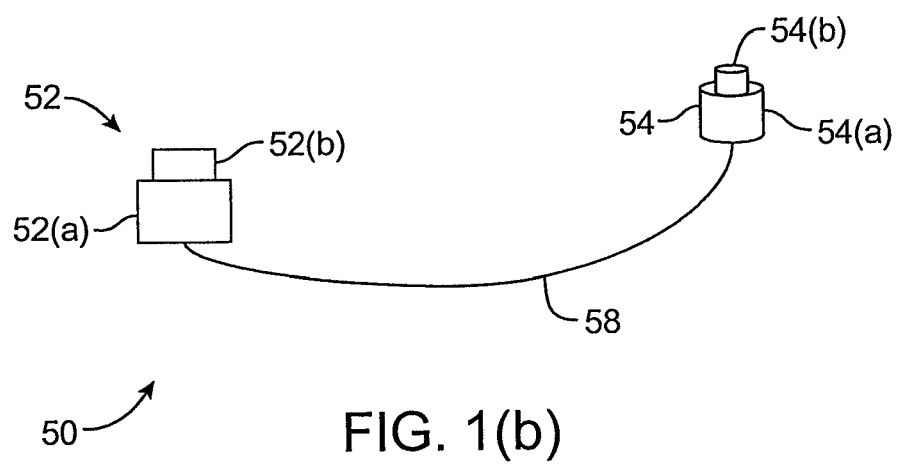
FIG. 1(b) shows connection apparatus including an input connector.

FIG. 1(b) shows an auxiliary connection device 50, which includes an auxiliary connector 52 including a body portion 52(a) and a mating portion 52(b). The mating portion 52(b) can be a plug which can plug into the auxiliary connector port 10(b) in the power adapter 10 shown in FIG. 1(a). Another connector 54 including a body portion 54(a) and a connector portion 54(b) may be coupled to the auxiliary connector 52 via a wire 58. The auxiliary connection device 50 can provide low voltages to low voltages devices such as cell phones, while the connectors 32, 33 shown in FIG. 1(a) can provide higher voltages to higher voltage devices such as notebook computers.

Figure 2A:
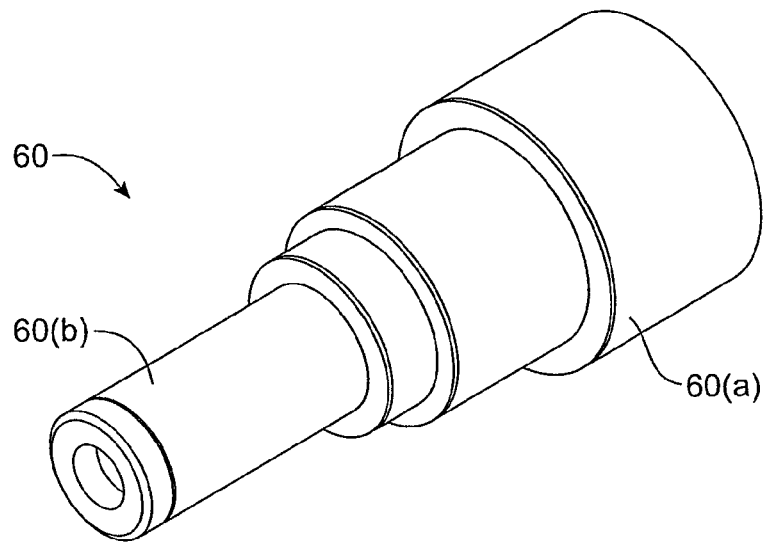
FIGS. 2(a)-2(c) show perspective views of connector tips according to embodiments of the invention.

FIG. 2(a) shows a connector 60 in the form of a connector tip. The connector 60 includes a body portion 60(a) comprising plastic and a mating portion 60(b) comprising electrical contacts.

Figure 2B:
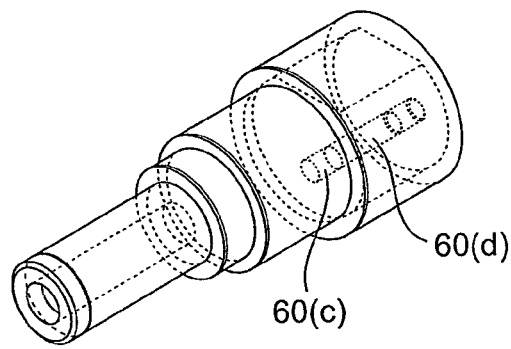

FIG. 2(b) shows a first connector including electrical contacts 60(c), 60(d), which would connect to corresponding contacts in an output connector (not shown) to provide a first output voltage.

Figure 2C:
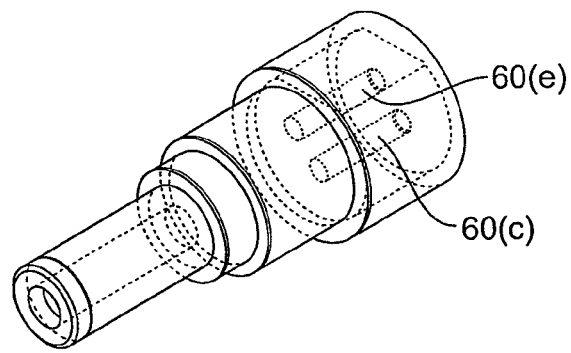
Figure 3A:
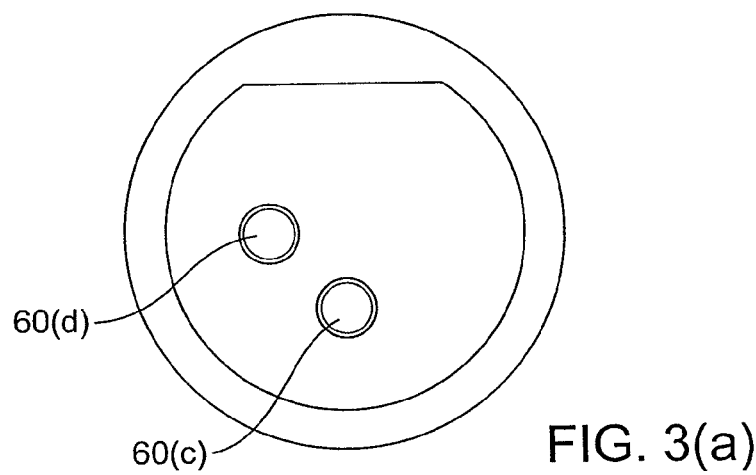
FIGS. 3(a)-3(b) show end views of connector tips, showing different contacts.
Figure 3B:
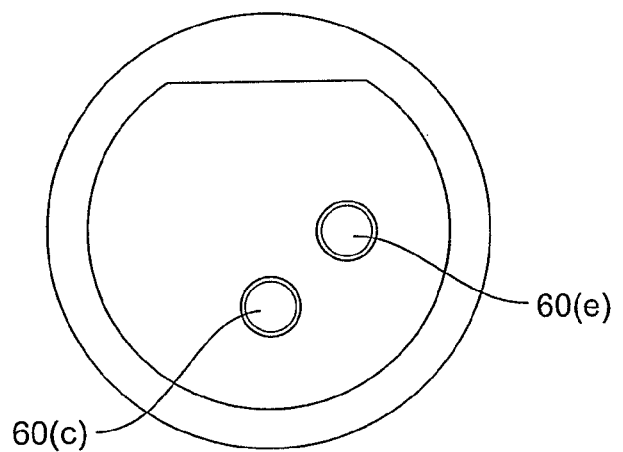

FIG. 2(c) shows a second connector including electrical contacts 60(c) and 60(e), which would connect to corresponding contacts in an output connector (not shown) to provide a second output voltage. FIGS. 3(a) and 3(b) show end views of the connectors shown in FIGS. 2(b) and 2(c).

Other embodiments of the invention are also possible. For example, instead of a connector tip being detachable from an output connector coupled to a cable, the cable can be completely detachable from an adapter body (e.g., the "brick") and the connector tip may be a permanent part of the cable. The connector between the cable and adapter body uses the method described above to output one of the available voltages from a single output connector. In another embodiment, the adapter body can provide output voltage contacts that are covered by a slide, such that the user would have to move the slide to one side to expose either the 16 VDC or 19 VDC contact in the output connector. By selecting one contact, the other is rendered useless by the slide which covers the unselected contact.

The power supply system described above can be used in any suitable manner. For example, a user may first obtain the above-described power supply system. Then, the user may look on a chart or the like (an example of a chart is provided below), to match his first electronic device (e.g., a notebook computer) to a first connectable connector (e.g., a connector tip). The consumer may thereafter connect the first connectable connector to the output connector coupled to the above-described power circuit. The connected first connector will then output a specific voltage (e.g., 16 VDC), even though the power circuit in the power adapter and the output connector coupled to the power circuit are outputting a plurality of voltages. If the consumer has a second electronic device that operates at a different voltage than the first electronic device, then the user may detach the first connector from the output connector and may then attach the second connector to the output connector and the second electronic device to power the second electronic device.

Figure 4:
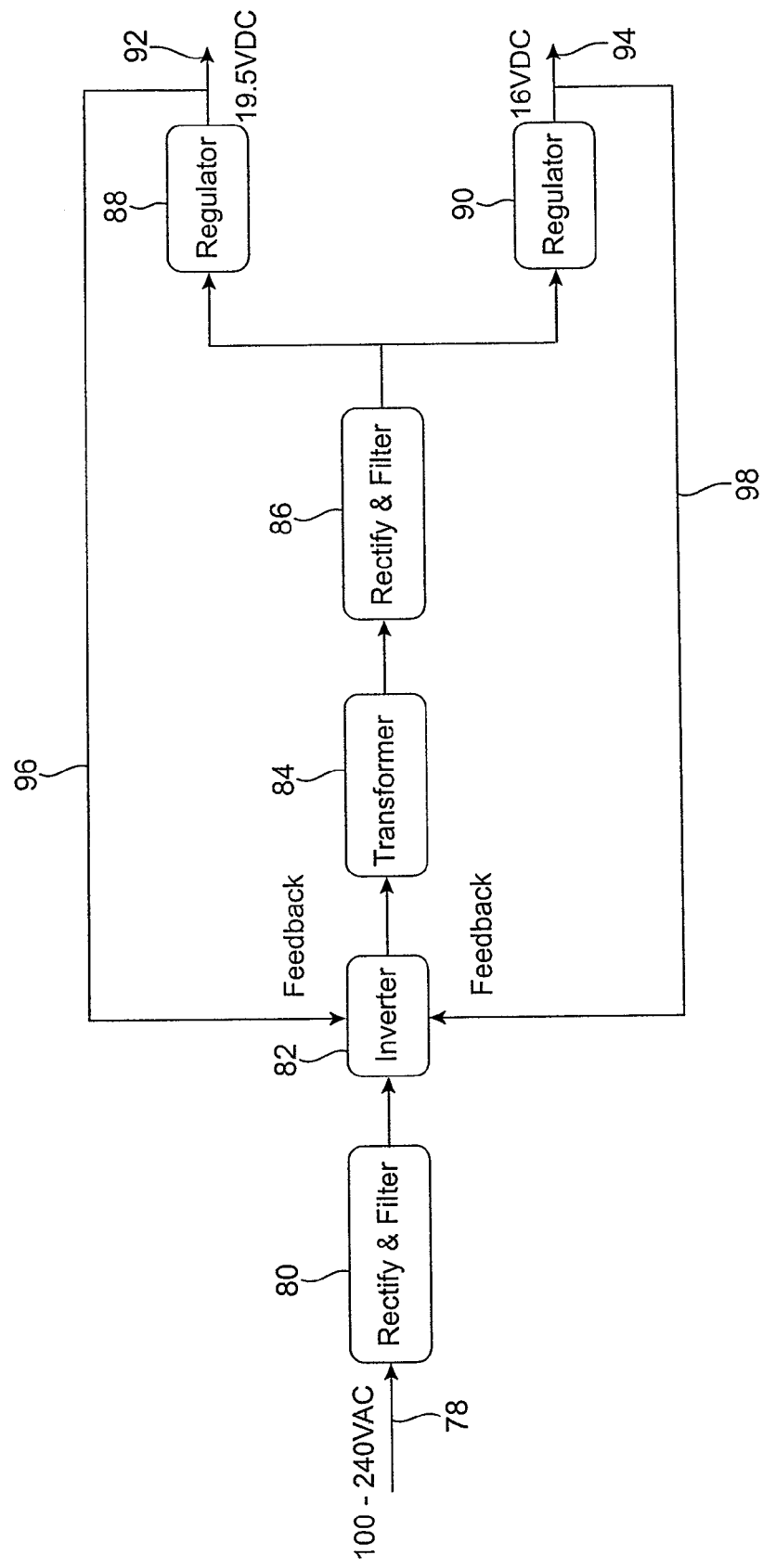
FIG. 4 shows a block diagram of a power circuit for an AC to DC converter.
Figure 5:
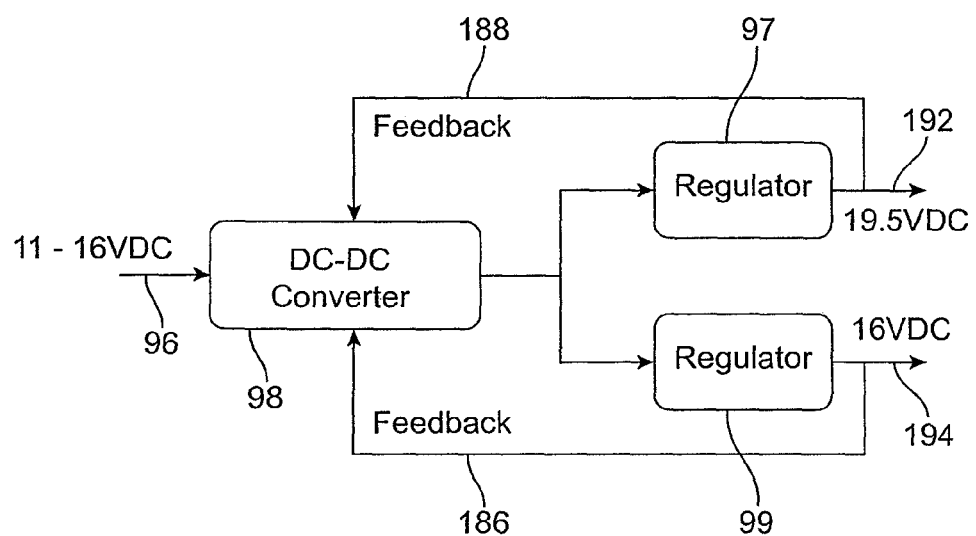
FIG. 5 shows a block diagram of a power circuit for a DC to DC converter.

Exemplary power circuits that can be used with the embodiments described above with respect to FIGS. 1-3 are described in FIGS. 4-5.

FIG. 4 shows a block diagram of a power circuit according to an embodiment of the invention. The power circuit converts AC power, for example from a wall socket, to DC power that may be used to power a portable device. As shown, there is one AC input and there are two DC outputs. The power circuit includes an AC input line 78, which provides an AC voltage (e.g., 100-240 VAC) to a rectifier and an optional filter 80. The rectifier and filter 80 changes the AC input voltage to a DC output voltage (e.g., 50-120 VDC). The DC output voltage is then fed to an inverter 82, which generates an AC signal (e.g., 20 kHz at 50-120 VAC) that is stepped down in voltage by a transformer 84 (e.g., 20-60 VAC). The stepped-down AC voltage is then sent to another rectifier and optional filter combination 86, where the AC voltage is changed to a DC voltage (e.g., 25-60 VDC). The DC voltage is then fed to different regulators 88 and 90 which produce output voltages at contacts 92, 94 respectively. In a specific embodiment of the present invention, the regulators 88 and 90 generate voltages of 19.5 VDC and 16 VDC, though in other embodiments, other voltage may be provided. Feedback lines 96 and 98 provide signals back to the inverter 82 to regulate the output voltages.

As explained above, a first connector tip that is configured to deliver 19.5 VDC to an electronic device (such as a computer) may have contacts that electrically couple to the 19.5 VDC contact and to a ground contact (not shown). A second connector tip that is configured to deliver 16 VDC to another type of electronic device (or different brand of computer) may have contacts that electrically couple to the 16 VDC contact and to the ground contact.

FIG. 5 shows a DC to DC power supply circuit for a DC to DC power supply system. As shown, the power circuit may include a DC input line 96 (e.g., 11-16 VDC) which receives a DC voltage from a DC source (e.g., from a car cigarette lighter socket). A DC-DC converter 98 receives the DC voltage from the DC input line 96, and this DC voltage may be fed to the appropriate voltage regulators 97, 99, which output the desired voltages of 19.5 VDC and 16 VDC to contacts 192, 194. Feedback lines 188, 186 send signals to the DC-DC converter 98 to regulate the voltages provided to the regulators 97, 98.

In other embodiments, a combination AC to DC and DC to DC converter may be created by combining the power circuits shown in FIGS. 4 and 5. One way of doing this would be to provide for a power adapter that includes the circuits in FIGS. 4 and 5. Each circuit could have its own input connector and its own output connector. Another way of creating a combined AC to DC and DC to DC converter with a common output connector would be to electrically couple the 19.5 VDC contacts 92, 192 together while also electrically coupling the 16 VDC contacts 94, 194 together. By coupling the output contacts together, a single output connector may be used for both the AC to DC conversion circuit and the DC to DC conversion circuit. Diodes or other appropriate electrical elements may be between the circuits to prevent current from one power circuit from passing to the other during operation. In such combination circuits, various electronic components may be shared, if desired. For example, both the AC to DC and DC to DC power circuits may share the same regulators instead of having different regulators. These features may also be used in later described embodiments.

In other embodiments of the invention, a user may use a switch to cause a power circuit to output a desired voltage instead of having the power circuit output a plurality of voltages simultaneously. An example can be described with to FIGS. 6(*a*)-6(*c*).

FIG. 6(*a*) shows a block diagram of a power circuit according to an embodiment of the invention. The power circuit converts AC power to DC power. The power circuit includes an AC input line 278, which provides an AC voltage (e.g., 100-240 VAC) to a rectifier and an optional filter 280. The AC input line 278 may receive AC voltage from an AC source such as a power outlet in a home. The rectifier and filter 280 changes the AC input voltage to a DC output voltage (e.g., 50-120 VDC). The DC output voltage is then fed to an inverter 282, which generates an AC voltage (e.g., 20 kHz at 50-120 VAC) that is stepped down by a transformer 284 (e.g., 20-60 VAC). The stepped-down AC voltage is then sent to another rectifier and optional filter combination 286, where the AC voltage is converted to a DC voltage (e.g., 25-60 VDC). The DC voltage is then fed to a variable regulator 210 which produces output voltages at contacts 292, 294 respectively, depending on the state of the switch 218. A specific embodiment of the present invention provides output voltages of 19.5 VDC and 16 VDC, though in other embodiments other voltages may be provided. A feedback line 216 provides a signal back to the inverter 282 to regulate the output voltages.

In this example, when an AC signal is input to line 278, an output voltage of 16 VDC is provided at a first contact 292 when the switch 218 is open. The open state of the switch 218 sends a signal to the variable regulator 210 to cause the variable regulator 210 to output a voltage of 16 VDC to only the first contact 292, without outputting a voltage of 19.5 VDC to the second contact 294.

As shown in FIG. 6(*b*), a first connector 220 may have a body portion 220(*a*) and a mating portion 220(*b*). The body portion 220(*a*) may have two contacts 220(*c*), which are configured to mate or connect to the first and third contacts 292, 295 in the output connector 299. The two contacts 220(*c*) and/or the mechanical configuration of the body portion 220(*a*) may be such that the contacts 220(*c*) cannot couple to the second contact 294 in the output connector 299.

Also in this example, when an AC signal is input to line 278, an output voltage of 19 VDC is provided at a second contact 294 when the switch 218 is closed. The closed state of the switch 218 sends a signal to the variable regulator 210 to cause the variable regulator 210 to output a voltage of 19 VDC to only the second contact 294, without outputting a voltage of 16 VDC to the first contact 292.

As shown in FIG. 6(*c*), a second connector 222 may have a body portion 222(*a*) and a mating portion 222(*b*). The body portion 222(*a*) may have two contacts 222(*c*), which are configured to mate or connect to the second and third contacts 294, 295 in the output connector 299. The two contacts 222(*c*) and/or the mechanical configuration of the body portion 222(*a*) may be such that the contacts 222(*c*) cannot couple to the first contact 292 in the output connector.

To assist the user in selecting the correct connector, connector indicators such as numbers, colors, letters, etc., could be placed on the connectors 220, 222 and proximate the on and off positions of the switch 218 so that the indicators indicate to the user which connector corresponds to which switch position. For example, the "off position" of the switch 218 may be associated with a blue label and the first connector 220 may have a corresponding blue label. The "on position" of the switch 218 may be associated with a green label and the second connector 222 may have a corresponding green label. A chart or other information medium may be used to inform the user as to which color is associated with his portable consumer device. Using such color codes (or other indicators), the user will know which connector 220, 222 to use, and will know how to position the switch 218.

Figure 6A:
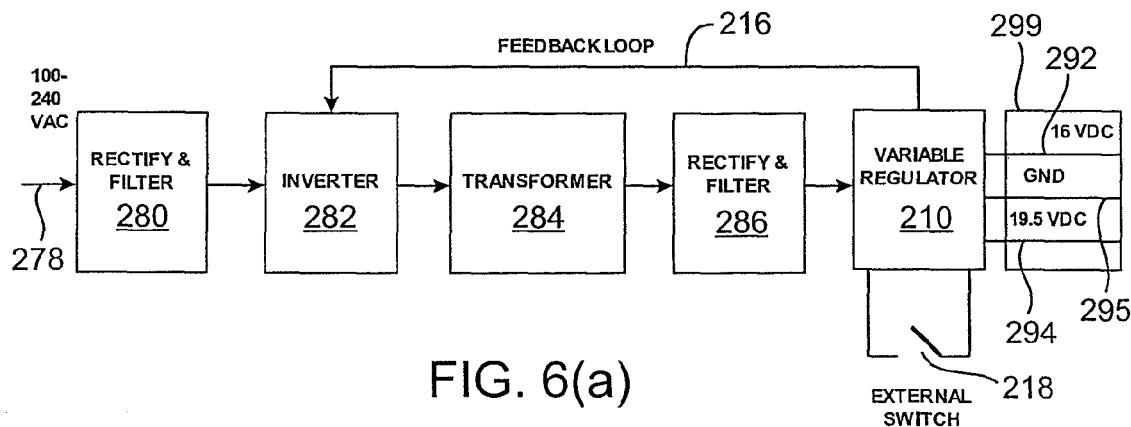
FIG. 6(a) shows a block diagram of a power circuit according to another embodiment of the invention.
Figure 6B:
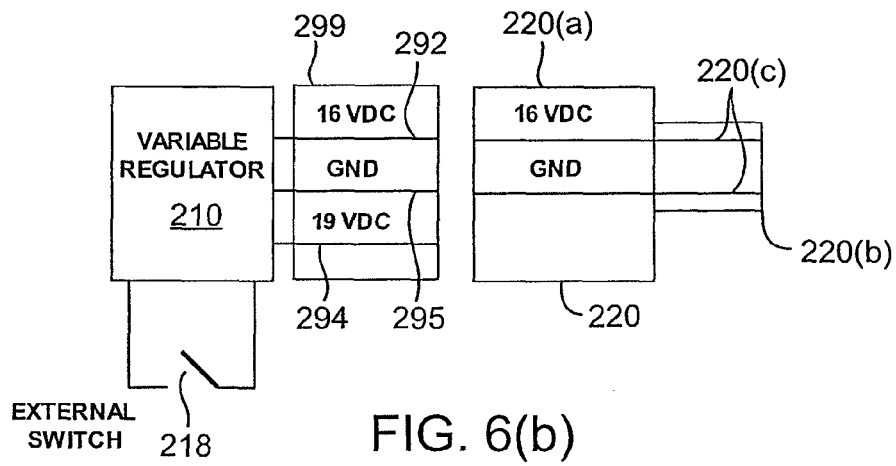
FIGS. 6(b) and 6(c) respectively show schematic diagrams of first and second connectors and a portion of the circuit shown in FIG. 6(a).
Figure 6C:
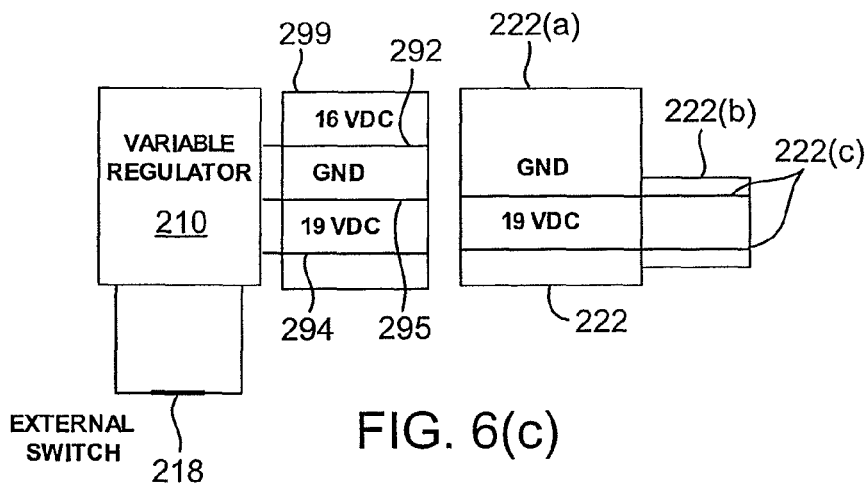

The embodiments described with respect to FIGS. 6(a)-6(c) have a number of additional advantages. In the embodiments described with respect to FIGS. 6(a)-6(c), it is highly unlikely that a user would use the wrong connector with his portable consumer device and consequently damage his portable consumer device. For example, to potentially damage his portable consumer device, the consumer would need to select the incorrect switch position, and also select the incorrect connector. If the consumer selects the incorrect switch position, but the correct connector, then the power supply would output 0 Volts. For example, referring to FIGS. 6(b) and 6(c), the user may have a computer that is powered by 16 VDC. The user may incorrectly close the switch 218 as shown in FIG. 6(c) and may incorrectly select a 19 VDC output. If the user selects the correct connector 220 that is associated with a 16 VDC output as shown in FIG. 6(b), and mechanically couples it to the output connector 299, then the output of the connector 220 would be 0 Volts, since the contacts 220(c) would not be coupled to the live 19 VDC contact 294. Thus, the user would not inadvertently supply the incorrect voltage to his computer. The embodiments shown in FIGS. 6(a)-6(c) are much safer for the consumer to use and make it more likely that the user will not inadvertently provide the wrong output voltage to his computer.

The embodiments described with respect to FIGS. 6(a)-6(c) specifically relate to an AC to DC power supply system. It is understood that the same general principles may apply to a DC to DC power supply system (as described above with respect to FIG. 5) and a combination AC to DC and DC to DC power supply system (as described above). For example, the DC to DC converter shown in FIG. 5 can be modified with one or more switches to open and close the circuits including the 16 VDC and 19.5 VDC contacts.

Other embodiments of the invention can be described with reference to FIGS. 7(a)-7(c). These embodiments can use a voltage output indicator device to indicate the voltage that is being output by the power circuit in the power adapter. Using the indicator device, the user can be certain that he has selected the correct voltage.

Figure 7A:
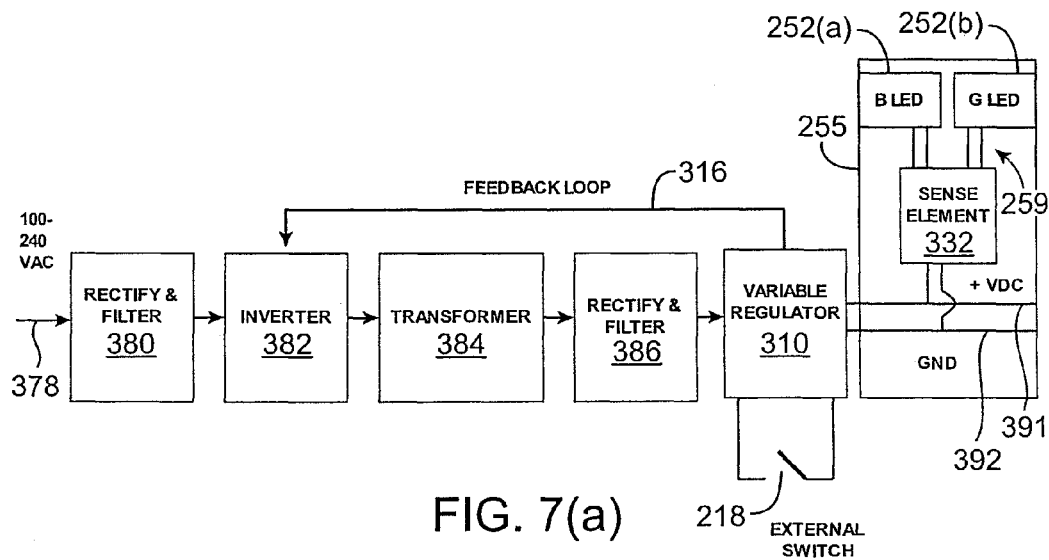
FIG. 7(a) shows a block diagram of another power circuit and an output connector.

FIG. 7(a) shows a block diagram of a power circuit according to an embodiment of the invention. The power circuit converts AC power to DC power. The power circuit includes an AC input line 378, which provides an AC voltage (e.g., 100-240 VAC) to a rectifier and an optional filter 380. The AC input line 378 may receive an AC voltage from an AC source such as a power outlet in a home. The rectifier and filter 380 changes the AC input voltage to a DC output voltage (e.g., 50-120 VDC). The DC output voltage is then fed to an inverter 382, which generates an AC voltage (e.g., 20 kHz at 50-120 VAC) that is stepped down by a transformer 384 (e.g., 20-60 VAC). The stepped-down AC signal is then sent to another rectifier and optional filter combination 386, where the AC voltage is changed to a DC voltage (e.g., 25-60 VDC). The DC voltage is then fed to a variable regulator 310 which produces output voltages at contacts 391, 392 respectively, depending on the state of the switch 218. A specific embodiment of the present invention provides output voltages of 19.5 VDC and 16 VDC, though other embodiments of the present invention may provide other output voltages. A feedback line 316 provides a signal back to the inverter 382 to regulate the output voltages.

In this embodiment, there are two output contacts 391, 392 coupled to the variable regulator 310, instead of three as in the embodiments described above with reference to FIGS. 6(a)-6(c). The two output contacts 391, 392 may comprise a ground contact 391 and a positive voltage contact 392. The state of the positive voltage contact can be 16 or 19.5 volts, depending upon the state of the switch 218. For example, if the switch 218 is closed, then the output voltage may be 16 VDC. If the switch 218 is open, then the output voltage may be 19.5 VDC. Although the switch 218 has two discrete states in this example, it is understood that it may have more than two discrete states in other examples.

The power supply system may also comprise a voltage output indicator device 259. In this example, the voltage output indicator device 259 comprises a sense element 332 such as a chip, and lighting elements such as LEDs. Referring to FIG. 7(a), the sense element 332 may be electrically coupled to the contacts 392, 391. The sense element 332 may sense the voltage of contact 392, and may cause a blue LED 352(a) to light up if the voltage of the contact 392 is at 16 VDC and may cause a green LED 352(b) to light up if the voltage of the contact 392 is at 19.5 VDC. At least part (e.g., the LEDs) of the voltage output indicator device 259 is in the output connector 255, to help the user select the correct connectable connector.

Figure 7B:
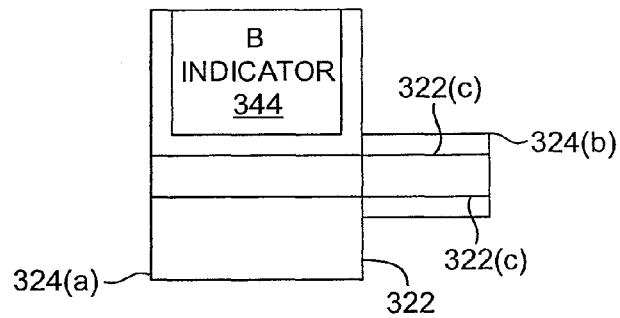
FIGS. 7(b) and 7(c) show schematic diagrams of first and second connectors according to another embodiment of the invention.
Figure 7C:
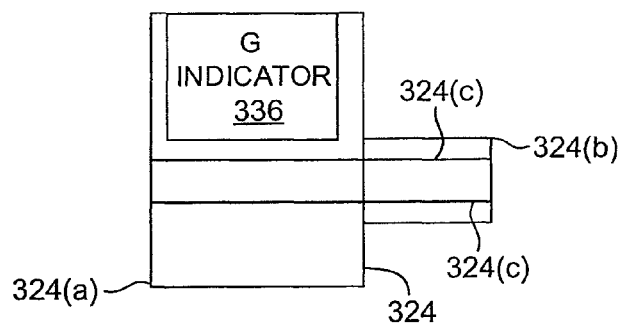

As shown in FIGS. 7(b) and 7(c), two connectors 322, 324 may be removably coupled to the output connector 255 containing the contacts 391, 392. Each connector 322, 324 comprises a main portion 322(a), 324(a) and a mating portion 322(b), 324(b), as well as contacts 322(c), 324(c), which can connect to the contacts 391, 392 in the output connector 255. Each connector 322, 324 may also comprise an indicator 344, 336. In this example, the indicators are static indicators such as color stickers or color labels. The different mating portions 322(b), 324(b) may have different form factors so that they mate with different power connectors on respectively different portable consumer devices.

To choose the correct state of the switch 218 and consequently the correct voltage, the user may look on a chart which shows his computer and may match, for example, the color blue to his computer if his computer will accept 16 VDC. An example of such a chart is shown below. As shown, there can be a column for a computer manufacturer, the indicator state (color code) associated with the manufacturer's computers, the voltage range accepted by the manufacturer's computers, and possible connectors (e.g., identified by letter) that can be used with the manufacturer's computers.

| Computer Manufacturer | Color Code | Voltage | Try This Connector |
| --- | --- | --- | --- |
| Manufacturer A | Green | 17-21 V | D, H |
| Manufacturer B | Green | 17-21 V | E, H, I |
| Manufacturer C | Blue | 14-17 V | H, J |

After the user identifies the color associated with his computer, the user may then select the position on the switch 218 which may be associated with the selected color (e.g., blue). After the user manipulates the switch 218, the user may look at the blue indicator 344 on the connector 324 and may then couple the conductors 324(c) in the connector 324 to the contacts 391, 392 in the output connector 255.

By using LEDs with different colors, the user has a reference to what the output voltage the power adapter is producing at any moment. For safety purposes, the user can check to see if there is agreement between the connectable connector color, the LED color in the output connector, and switch color before plugging the power supply connector into his computer.

Figure 7D:
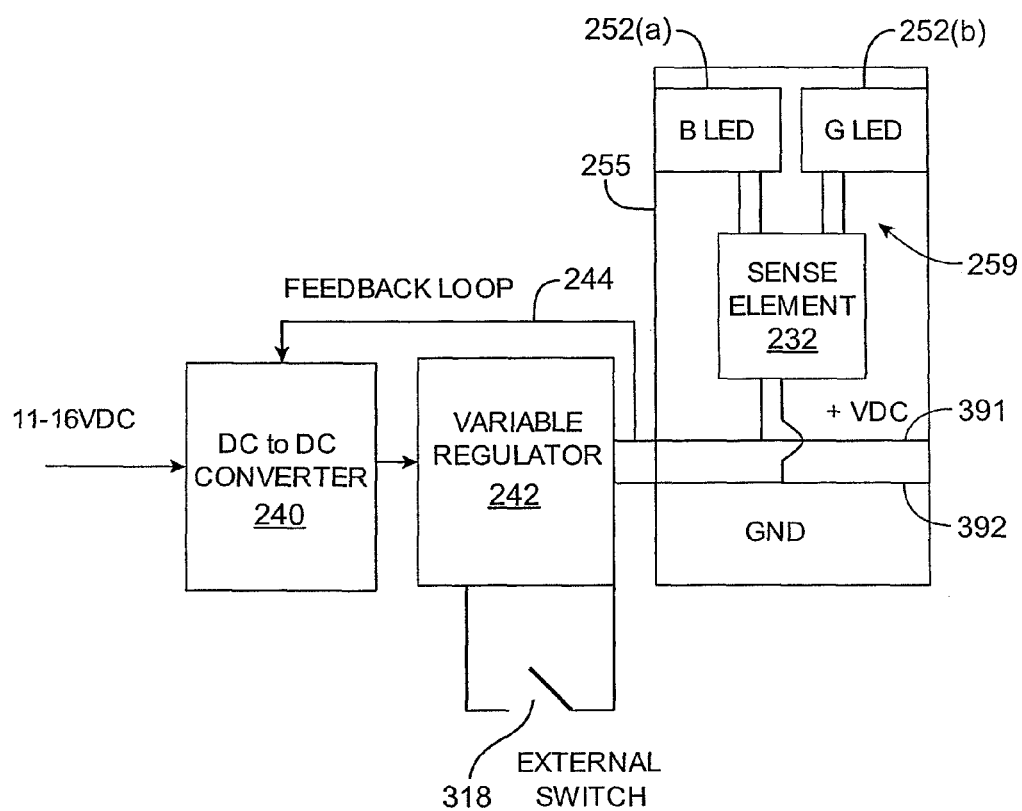
FIG. 7(d) shows a power circuit according to an embodiment of the invention.

The embodiments described with respect to FIG. 7(a) specifically relate to a AC to DC power supply system. It is understood that the same general principles may apply to a DC to DC power supply system (as described above with respect to FIG. 5) and a combination AC to DC and DC to DC power supply system (as described above). For example, referring to FIG. 7(d), a DC to DC circuit may comprise a DC to DC converter 240 and a variable regulator 242 coupled to the DC to DC converter 240. An output connector 255 may be coupled to the variable regulator 242. The illustrated components in the connector 255 are described above with respect to FIG. 7(a), and the descriptions of those components need not be repeated here. An external switch 318 may be coupled to the variable regulator 242 to adjust the voltage output by the variable regulator 242. A feedback loop 244 may send a signal back to the DC to DC converter 240 to regulate the voltage output by the DC to DC converter 240.

Figures 8A, 8B:
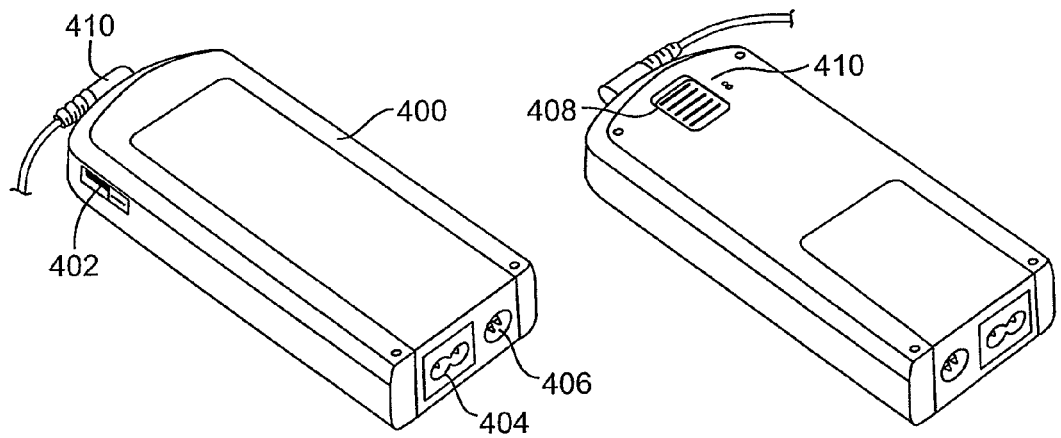
FIGS. 8(a) and 8(b) respectively show top perspective and bottom perspective views of a power adapter according to an embodiment of the invention.

FIG. 8(a) shows a perspective view of an adapter 400 according to an embodiment of the invention. The adapter 400 comprises a USB port 402, as well as a wall input cable port 404 and an auto/air input cable port 406. A cable 410 is also coupled to the adapter 400.

FIG. 8(b) shows the underside of the power adapter 400 shown in FIG. 8(b). A color coded selector 408 and a color coded selector button 410 are shown.

Figure 8C:
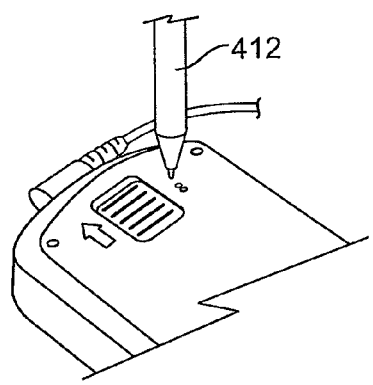
FIG. 8(c) shows a bottom perspective view of the power adapter shown in FIG. 8(b) when it is changing states.

As shown in FIG. 8(c), to set up the adapter 400, the user may use a pen 412 to press the selector button 412 and at the same time may slide the color-coded selector button 410 to match the color code for the user's computer. By using the pen 412 and selector button 412, the user will not inadvertently select the incorrect voltage by inadvertent movement of the color-coded selector button 410.

The user may then try various connectors (which may be in the form of connector tips) and may connect them to the output connector coupled to the adapter 400 and to the user's computer. As noted above, the selected connector may be color coded "blue" and the output connector may have an LED that glows "blue" so that the user can easily verify that the correct voltage will be supplied to his computer.

Figure 9:
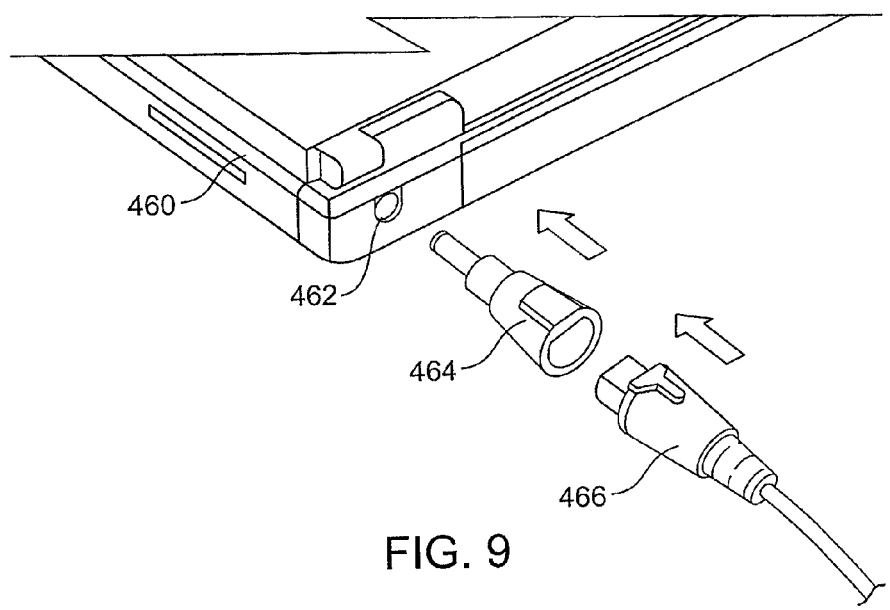
FIG. 9 shows a system including a cable end, a connector, and a portable electronic device such as a portable computer.

FIG. 9 shows an output connector 466 and a computer 460 with a power port 462. A connectable connector 464 is removably connectable to both the output connector 466 and the power port 462.

Figure 10A:
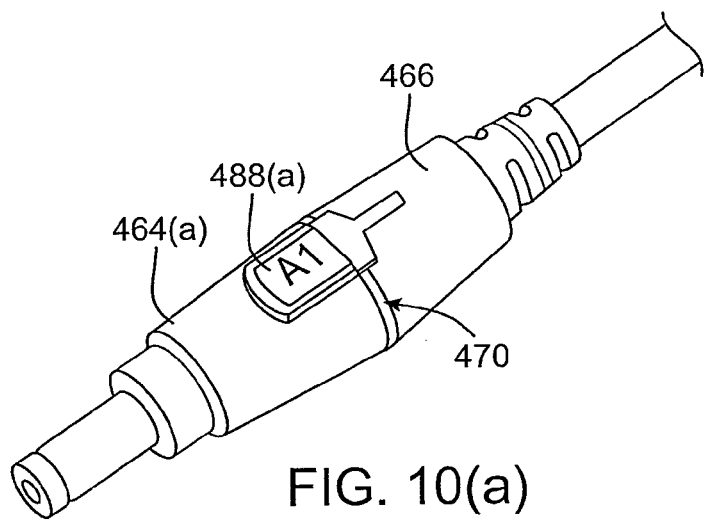
FIGS. 10(a) and 10(b) show perspective views of first and second connectors coupled to the end of a cable connector.
Figure 10B:
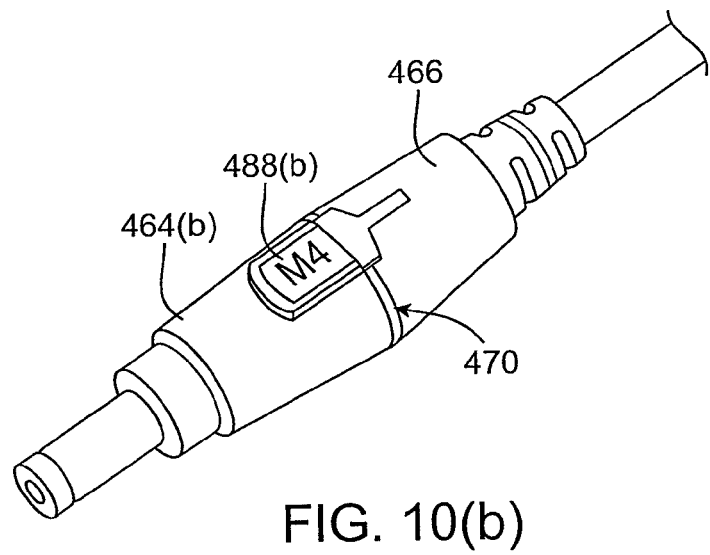

FIG. 10 shows two connectable connectors 464(a), 464(b) coupleable to an output connector 466. The output connector 466 also comprises band 470 which can provide light from the previously described blue and green LEDs. The connectors 464(a), 464(b) may have blue and green indicators 488(a), 488(b), respectively, so that the user knows which connector to use. As explained above, when the band 470 glows green, the user can use the connector with the green indicator. When the band 470 glows blue, the user can select the connector with the blue indicator. By using matching colors, it is unlikely that the user will use the incorrect connector and output the incorrect voltage.

Thus, as illustrated above, embodiments of the invention may be include manipulating a switch in a power circuit to a first state to generate a first output voltage, where the power circuit is capable of generating a second output voltage when the switch is in a second state. An output connector is coupled to the power circuit and outputs the first output voltage using at least a first electrical contact and a second electrical contact. The consumer can then view an output (e.g., a visual output) from a voltage output indicator device coupled to the first and second electrical contacts. The output indicates that the power circuit is producing the first output voltage. The user can then select a first connector comprising an indicator which matches the output from the voltage indicator device, and then attach the first connector to the output connector.

The above-described embodiments may be formed using any suitable methods. For example, in some embodiments, a power circuit comprising a switch is formed using conventional power supply manufacturing processes. The power circuit is adapted to generate a first output voltage and a second output voltage, depending on the state of the switch. An output connector can be attached to the power circuit. The output connector includes a plurality of electrical contacts including a first electrical contact and a second electrical contact. A voltage output indicator device is attached to the first and second electrical contacts. The voltage output indicates that the power circuit is producing the first output voltage or the second output voltage.

Embodiments of the invention have a number of advantages. As noted above, no feedback signal is sent from the connectors to the power supply circuit. Accordingly, the power circuit need not have a programmed IC chip that is adapted to change the output voltage in response to the connector tip that is used. Omitting such programmed chips reduces the cost of the power supply systems. In addition, since a single connector tip or connector can be used with many different notebook computers in embodiments of the invention, fewer connector tips or connectors are needed in embodiments of the invention, thus simplifying the system as compared to conventional universal power supply systems.

Although specific circuit implementations are shown in the foregoing Figures, it is understood that any suitable circuit implementation may be used to accomplish the end result of providing at least two conductive contacts in an output connector that can be used to provide different voltages to power different electronic devices.

Although much of the description above refers to two connector tips and three electrical contacts in an output connector, embodiments of the invention may include any number of connector tips, or connectors, and any number of electrical contacts in an output connector. For example, a power supply system according to an embodiment of the invention may have an output connector that may be configured to interface or mate with three, four, five, six, or more connector tips or connectors.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary. In addition, words such as "over", "under", etc. are used to described features as they are shown in the Figures and may or may not refer to absolute positions.

All patents, patent applications, publications, and descriptions mentioned above are herein incorporated by reference in their entirety for all purposes. None is admitted to be prior art.

What is claimed is:

1. A power supply system configured to power a plurality of portable electronic devices, the power supply system comprising:
   a power circuit adapted to generate a first output voltage and a second output voltage at the same time; and an output connector coupled to the power circuit, wherein the output connector includes a plurality of electrical contacts including a first set of contacts adapted to provide the first output voltage and a second set of electrical contacts adapted to provide the second output voltage at the same time as the first output voltage, the first and second sets of contacts being different, wherein the output connector is adapted to connect to a first connector configured to connect to and be detachable from the output connector and electrically couple to the first set of contacts to provide the first output voltage to a first electronic device, wherein the first connector is further configured to connect to a first port of the first electronic device, and wherein the output connector is adapted to connect to a second connector configured to connect to and be detachable from the output connector and electrically couple to the second set of contacts to provide the second output voltage to a second electronic device, wherein the second connector is further configured to connect to a second port of the second electronic device, and wherein the system comprises the first connector and the second connector, and wherein the first set of contacts and the second set of contacts share a common ground line.

2. The power supply system of claim 1 wherein the power circuit is adapted to receive an AC input signal.

3. The power supply system of claim 1 wherein the power circuit is adapted to receive a DC input signal.

4. The power supply system of claim 1 wherein the power circuit includes an AC to DC conversion circuit and a DC to DC conversion circuit.

5. The power supply system of claim 1 wherein the first voltage is about 16 Volts and wherein the second voltage is about 19 Volts.

6. The power supply system of claim 1 wherein there are exactly three electrical contacts in the plurality of electrical contacts including a first electrical contact at ground, a second electrical contact at 16 Volts, and a third electrical contact at 19 Volts.

7. The power supply system of claim 1 further comprising a casing disposed around at least a portion of the power circuit.

8. The power supply system of claim 1 further comprising an auxiliary connector coupled to the power circuit.

9. The power supply system of claim 8 wherein the auxiliary connector is adapted to connect to a USB connector.

10. The power supply system of claim 8, wherein the auxiliary connector is coupled to the power circuit through an auxiliary connection port.

11. The power supply system of claim 10, wherein the power circuit is adapted to generate a third output voltage that is output through the auxiliary connection port, wherein the third output voltage is lower than the first output voltage and the second output voltage.

12. The power supply system of claim 1, wherein the first connector is configured to electrically couple to the first set of contacts to provide the first output voltage to a third electronic device, wherein the third electronic device is different than the first electronic device.

13. The power supply system of claim 1, wherein the first connector is a first connector tip and the second connector is a second connector tip.

14. The power supply system of claim 1, wherein the first connector has a first body portion configured to connect to and be detachable from the output connector and a first mating portion configured to connect to and be detachable from the first port of the first electronic device, and wherein the second connector has a second body portion configured to connect to and be detachable from the output connector and a second mating portion configured to connect to and be detachable from the second port of the second electronic device, a form factor of the first body portion being equal to a form factor of the second body portion and a form factor of the first mating portion being different than a form factor of the second mating portion.

* * * * *